US008903302B2

(12) United States Patent
Morimoto

(10) Patent No.: US 8,903,302 B2
(45) Date of Patent: Dec. 2, 2014

(54) INFORMATION PROCESSOR, PRINTING SYSTEM, METHOD FOR PRINTING AND RECORDING MEDIUM

(75) Inventor: Tsuyoshi Morimoto, Tachikawa (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 183 days.

(21) Appl. No.: 13/554,674

(22) Filed: Jul. 20, 2012

(65) Prior Publication Data

US 2013/0028646 A1 Jan. 31, 2013

(30) Foreign Application Priority Data

Jul. 26, 2011 (JP) ................................ 2011-163746

(51) Int. Cl.
*G03G 15/00* (2006.01)
*G06F 3/12* (2006.01)
*B65H 37/04* (2006.01)

(52) U.S. Cl.
CPC .. *G03G 15/6541* (2013.01); *G03G 2215/00282* (2013.01); *B65H 37/04* (2013.01); *G03G 2215/00729* (2013.01); *G03G 2215/00936* (2013.01); *G03G 2215/00831* (2013.01); *B65H 2511/411* (2013.01); *B65H 2515/60* (2013.01); *B65H 2301/436* (2013.01)
USPC .......................................................... 399/408

(58) Field of Classification Search
CPC ................................ G03G 15/00; G06F 3/12
USPC ................................................ 399/407, 408
See application file for complete search history.

(56) References Cited

U.S. PATENT DOCUMENTS

| | | | |
|---|---|---|---|
| 6,985,245 | B1 | 1/2006 | Takahashi |
| 7,410,158 | B2 | 8/2008 | Iida et al. |
| 2006/0023244 | A1 | 2/2006 | Mitsui |

FOREIGN PATENT DOCUMENTS

| | | | | | |
|---|---|---|---|---|---|
| CN | 1728079 | A | | 2/2006 | |
| CN | 101122846 | A | | 2/2008 | |
| EP | 1098243 | A2 | | 5/2001 | |
| EP | 1 098 243 | A2 | | 9/2001 | |
| JP | 8-220942 | A | | 8/1996 | |
| JP | 2001-022134 | A | | 1/2001 | |
| JP | 2001-22134 | A | | 1/2001 | |
| JP | 2007140767 | A | * | 6/2007 | ................ G06F 3/12 |
| JP | 2010-204679 | A | | 9/2010 | |

OTHER PUBLICATIONS

The extended European Search Report dated Nov. 16, 2012, issued in corresponding European Patent Application 12177598.6-2216 (6 pgs.).

First Notification of the Opinion on Examination issued in corresponding Chinese Patent Application No. 201210259803.X, issued on Aug. 5, 2014 and English translation.

* cited by examiner

*Primary Examiner* — Nguyen Ha
(74) *Attorney, Agent, or Firm* — Buchanan Ingersoll & Rooney PC

(57) ABSTRACT

In a sheet collection planned to be prepared, when there exists a monochrome sheet group comprised of one or more consecutive monochrome sheets all of whose front and back sides are monochrome pages, between two color sheet groups comprised of one or more consecutive color sheets having a color page on at least one of front and back sides, an information processor determines that sheets in the monochrome sheet group and each one or each two sheets before and after the monochrome sheet group sandwiching the monochrome sheet group are saddle-stitched sheets formed by papers for saddle-stitching. The information processor determines that any sheet other than those determined to be the saddle-stitched sheets are sheets of an adhesive bound group.

20 Claims, 9 Drawing Sheets

Color=12 sheets
B/W=8 sheets
100a
100b
100d
100e
↓Two sheets into one sheet
↓Two sheets into one sheet Color=10 sheets
B/W=10 sheets
100c
100f
100g
100h

INFORMATION PROCESSOR, PRINTING SYSTEM, METHOD FOR PRINTING AND RECORDING MEDIUM

This application claims priority under 35 U.S.C. §119 to Japanese Patent Application No. 2011-163746 filed on Jul. 26, 2011, the entire disclosure of which is incorporated herein by reference in its entirety.

BACKGROUND OF THE INVENTION

1. Field of the Invention

The present invention relates to an information processor to be used in an imposition process during bookbinding, a printing system including the information processor, a method for printing, and a recording medium.

2. Description of the Related Art

The following description sets forth the inventor's knowledge of related art and problems therein and should not be construed as an admission of knowledge in the prior art.

In the printing industry, a job an order for which is received from a customer is printed. When a plurality of pages are printed on a sheet of paper, in order to maximize printing profit which is obtained by subtracting cost from sales, a method for printing by applying so-called a "color split function" wherein a page of a monochrome image is printed by a monochrome-printing machine and a page of a color image is printed by a color-printing machine has been widespread.

However, since the color split function is designed to perform printing with a monochrome-printing device and printing with a color-printing device on a paper basis, there are some cases in which even a page of a monochrome image must be printed by the color-printing device whose printing cost is more expensive.

In particular, in a case of performing bookbinding by stitching papers on which printing is performed in the unit of four pages in total, two pages each on both front and back sides, which are then center-folded by being double over, if even one of the four pages has a color image, the remaining three pages may have to be printed by a color-printing device although they are pages of a monochrome image. Thus, there is a problem that the cost advantage of using the color split function is considerably compromised if there exist a number of such papers to be color-printed.

In addition, the Japanese Patent Application Publication No. 2010-204679 proposes an image forming apparatus capable of performing a saddle-stitching process, and of automatically changing an imposition process if a maximum set count of pages to be saddle-stitched is exceeded.

However, the technology described in the Japanese Patent Application Publication No. 2010-204679 is not a technology for reducing a count of color-printed papers as many as possible and thus does not contribute to cost reduction, although the technology can automatically adjust a combination of the saddle-stitching and adhesive binding when the maximum set count of pages to be saddle-stitched is exceeded.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, the information processor comprising:

a first sheet count judging section for judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

a second sheet count judging section for judging whether a count of sheets from the one end of the sheet collection to a sheet immediately before the monochrome sheet group is odd or even, if the first sheet count judging section judges that the count of the monochrome sheets in the monochrome sheet group is even;

a determination section for not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the monochrome sheet group is odd, and if the second sheet count judging section judges that the count of sheets from the one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers.

A second aspect of the present invention relates to a printing system, comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor comprises:

a first sheet count judging section for judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

a second sheet count judging section for judging whether a count of sheets from the one end of the sheet collection to a sheet immediately before the monochrome sheet group is odd or even, if the first sheet count judging section judges that the count of the monochrome sheets in the monochrome sheet group is even;

a determination section for not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the monochrome sheet group is odd, and if the second sheet count judging section judges that the count of sheets from the one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting image data of corresponding four pages to the first printing device when image data of all pages is monochrome image data and to the second printing device when image data of at least one page is color image data, so that the sheets of the saddle-stitched group or the adhesive bound group determined by the determination section are formed by respective papers, wherein the first and second printing devices print on papers the image data transmitted from the information processor.

A third aspect of the present invention relates to a method for printing to be performed in a printing system comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor performs:

first sheet count judgment of judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

second sheet count judgment of judging whether a count of sheets from the one end of the sheet collection to a sheet immediately before the monochrome sheet group is odd or even, if it is judged in the first sheet count judgment that the count of the monochrome sheets in the monochrome sheet group is even;

determination of not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the monochrome sheet group is odd, and if it is judged in the second sheet count judgment that the count of sheets from one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting image data of corresponding four pages to the first printing device when image data of all pages is monochrome image data and to the second printing device when image data of at least one page is color image data, so that the sheets of the saddle-stitched group or the adhesive bound group determined in the determination are formed by respective papers, wherein the first and second printing devices performs printing on papers the image data transmitted from the information processor.

A fourth aspect of the present invention relates to a non-transitory recording medium in which an imposition process program for causing a computer of an information processor to be used when a sheet collection comprised of a plurality of sheets on which pages are arranged in order is prepared, by combining a plurality of papers on which printing is performed in the unit of four pages and which are center-folded by being doubled over with a back section as a center, and on which two sheets having each one page arranged on a front and a back are formed on both sides of the back section, to perform:

first sheet count judgment of judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

second sheet count judgment of judging whether a count of sheets from the one end of the sheet collection to a sheet immediately before the monochrome sheet group is odd or even, if it is judged in the first sheet count judgment that the count of the monochrome sheets in the monochrome sheet group is even;

determination of not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the monochrome sheet group is odd, and if it is judged in the second sheet count judgment that the count of sheets from one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting image data of corresponding four pages to the first printing device when image data of all pages is monochrome image data and to the second printing device when image data of at least one page is color image data, so that the sheets of the saddle-stitched group or the adhesive bound group determined in the determination are formed by respective papers.

A fifth aspect of the present invention relates to an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, the information processor comprising:

a first sheet count judging section for judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

a second sheet count judging section for judging whether a count of sheets from the one end of the sheet collection to a sheet immediately before the color sheet group is odd or even, when the first sheet count judging section judges that the count of the color sheets in the color sheet group is even;

a determination section for not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the color sheet group is odd, and if the second sheet count judging section judges that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers.

A sixth aspect of the present invention relates to a printing system, comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor comprises:

a first sheet count judging section for judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

a second sheet count judging section for judging whether a count of sheets from the one end of the sheet collection to a sheet immediately before the color sheet group is odd or even, when the first sheet count judging section judges that the count of the color sheets in the color sheet group is even;

a determination section for not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the color sheet group is odd, and if the second sheet count judging section judges that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers, wherein the first and second printing devices print on papers the image data transmitted from the information processor.

A seventh aspect of the present invention relates to a method for printing to be performed in a printing system comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor performs:

first sheet count judgment of judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

second sheet count judgment of judging whether a count of sheets from the one end of the sheet collection to a sheet immediately before the color sheet group is odd or even, when it is judged in the first sheet count judgment that the count of the color sheets in the color sheet group is even;

determination of not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the color sheet group is odd, and if it is judged in the second sheet count judgment that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting to one or more printing devices image data of corresponding four pages as monochrome image data if image data of all pages is monochrome image data and as color image data if image data of at least one page is color image data, so that the sheets of the saddle-stitched group or the adhesive bound group determined in the determination are formed by respective papers, and wherein the first and second printing devices perform printing on papers the image data transmitted from the information processor.

A eighth aspect of the present invention relates to a non-transitory recording medium in which an imposition process program for causing a computer of an information processor to be used when a sheet collection comprised of a plurality of sheets on which pages are arranged in order is prepared, by combining a plurality of papers on which printing is performed in the unit of four pages and which are center-folded by being doubled over with a back section as a center, and on which two sheets having each one page arranged on a front and a back are formed on both sides of the back section, to perform:

first sheet count judgment of judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

second sheet count judgment of judging whether a count of sheets from the one end of the sheet collection to a sheet immediately before the color sheet group is odd or even, when it is judged in the first sheet count judgment that the count of the color sheets in the color sheet group is even;

determination of not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the color sheet group is odd, and if it is judged in the second sheet count judgment that the count of the sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting to one or more printing devices image data of corresponding four pages as monochrome image data if image data of all pages is monochrome image data and as color image data if image data of at least one page is color image data, so that the sheets of the saddle-stitched group or the adhesive bound group determined in the determination are formed by respective papers.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
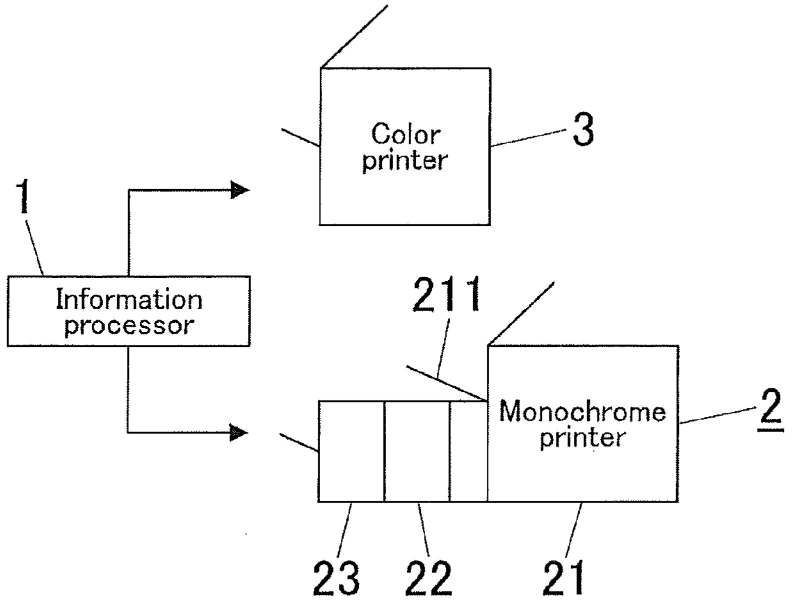
FIG. 1 is a configuration diagram of a printing system according to one embodiment of the present invention.

FIG. 1 is a configuration diagram of a printing system according to one embodiment of the present invention. The printing system includes an information processor 1, a monochrome printer 2, and a color printer 3.

The information processor 1 is comprised of a personal computer, and performs an imposition process for imposing a page to a paper in bookbinding, and transmits image data of the imposed page to the monochrome printer 2 or the color printer 3. In the embodiment, printing is performed in the unit of four pages on one paper.

The monochrome printer 2 is integrally formed of a printer body 21 for monochrome-printing monochrome image data of four pages which has been transmitted from the information processor, a center-folding machine 22 for center-folding papers, which have been printed by the printer body 21 or the color printer 3, on an individual paper basis or by placing a plurality of papers in piles, and a bookbinding machine 23 for binding papers which have been center-folded by the center-folding machine 22. In addition, a symbol 211 shown in FIG. 1 is a paper insertion tray (also referred to as a PI tray).

The color printer 3 color-prints image data of four pages which has been transmitted from the information processor. In the embodiment, if even one of the four pages has a color image, image data of the four pages are to be color-printed.

Figure 2:
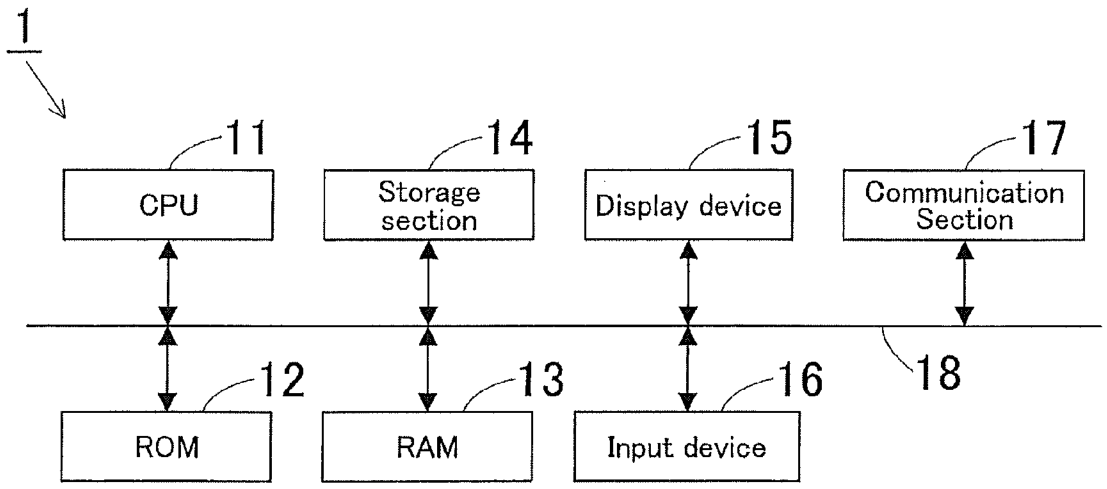
FIG. 2 is a block diagram showing a configuration of an information processor.

FIG. 2 is a block diagram showing a configuration of the information processor 1.

As shown in FIG. 2, the information processor 1 includes a CPU 11, a ROM 12, a RAM 13, a storage section 14, a display device 15, an input device 16, a communication section 17 and the like, and is connected to each other by way of a system bus 18.

The CPU 11 controls the entire information processor 1 in a coordinated manner by executing a program saved in the ROM 12. In particular, in the embodiment, the CPU performs the imposition process to a paper, which will be described in the following.

The ROM 12 is a memory for saving a program to be executed by the CPU 11 or other data.

The RAM 13 is a memory for providing a working area when the CPU 11 runs in accordance with an operating program.

The storage section 14 is comprised of a storage medium such as a hard disk, stores image data of each page to be printed on a paper, and, in addition, saves various types of application programs or data and the like.

The display device 15 is comprised of a CRT or a liquid crystal display device and the like, and displays various types of messages and a screen for accepting input, a screen for selection and the like, for users.

The input device 16 is used in an input operation by a user and comprised of a keyboard or a mouse and the like.

The communication section 17 transmits image data to be printed, to the monochrome printer 2 or the color printer 3 by way of a network and the like.

FIG. 3 is a view illustrating a method for stitching papers in bookbinding.

As described above, in the embodiment, printing is performed in the unit of four pages in total, on front and back sides and on right and left sides of one paper 100, and the printed paper 100 is center-folded so as to be doubled over. Therefore, after center-folding, for each one paper 100, two sheets 101, 102 on whose front and back sides each one page is arranged are formed on both sides of a back section 100*a*. Then, a plurality of papers 100 are combined and thereby bound to a sheet collection in which pages are arranged in order.

Figures 3A, 3B, 3C:
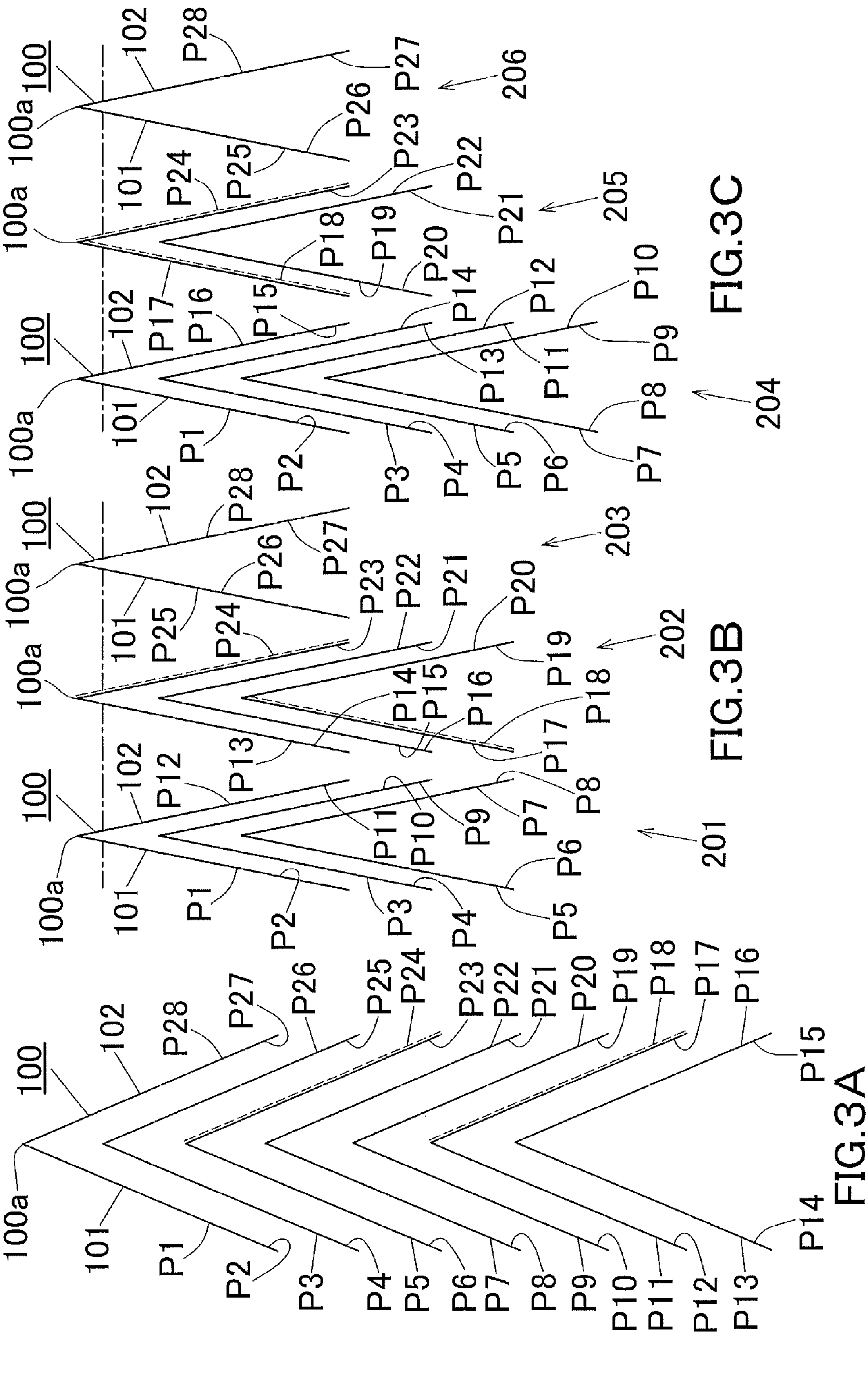
FIG. 3 is a view illustrating a method for stitching papers in bookbinding.

FIG. 3A shows a sheet collection comprised of 14 sheets formed by saddle-stitching seven papers. Saddle-stitching is a method for stitching a plurality of center-folded papers 100, piled in a thickness direction, at the back section 100*a*. In this example, a sheet collection has pages from page 1 (P1) to page 28 (P28), among which page 18 and page 24 are color pages. In addition, the color pages are shown by a dashed line. In this example, since the color pages, page 18 and page 24, are imposed on separate papers, a count of papers color-printed by the color printer 3 is two.

Although FIG. 3B also shows a sheet collection comprised of 14 sheets similarly formed by seven papers, a method for stitching thereof differs from that in FIG. 3A. Specifically, a first saddle-stitched channel 201 made by saddle-stitching three papers, a second saddle-stitched channel 202 similarly made by saddle-stitching three papers, and an adhesive bound channel 203 comprised of one center-folded paper are adhesive bound at the back section 100*a*. Adhesive binding is a method for stitching adhesive bound channels to each other, saddle-stitched channels to each other, or an adhesive bound channel to saddle-stitched channel together, at the back section of the papers or in the vicinity thereof. A dashed line shown in FIG. 3B shows a stitching position.

In addition, also in this example, page 18 and page 24 are color pages. Since the color pages, page 18 and page 24, are imposed on separate papers, a count of papers to be color-printed by the color printer 3 is two, as with the case of FIG. 3A.

FIG. 3C also shows a sheet collection comprised of 14 sheets similarly formed by seven papers. In this example, a first saddle-stitched channel 204 made by saddle-stitching four papers, a second saddle-stitched channel 205 similarly made by saddle-stitching two papers, and an adhesive bound channel 206 made by one center-folded paper are adhesive bound at the back section 100*a* or in the vicinity thereof.

Also in this example, page 18 and page 24 are color pages, although the color pages, page 18 and page 24, are imposed on one same paper. Thus, a count of papers to be color-printed by the color printer 3 is one.

As such, even for the sheet collection having the color pages of page 18 and page 24, a count of color-printed papers can be reduced by combining saddle-stitched channels and adhesive bound channels or adjusting a count of pages of the saddle-stitched channel and performing the imposition process.

Next, an imposition process for reducing the count of color-printed papers to be carried out by the information processor 1 according to the embodiment will be described with reference to FIG. 4 to FIG. 7.

Figure 4:
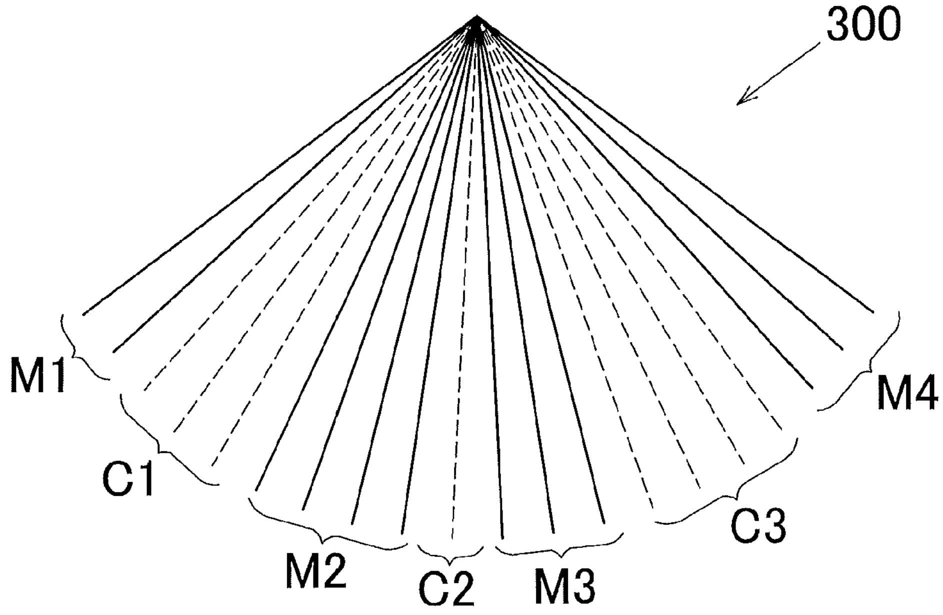
FIG. 4 is a view schematically showing a sheet collection planned to be prepared.

FIG. 4 is a view schematically showing a sheet collection 300 planned to be prepared. In the sheet collection 300 to be shown in and after FIG. 4, a solid line shows a monochrome sheet which has a monochrome page on both front and back sides, while a dashed line shows a color sheet which has a color page on at least either the front or back side.

In the example of FIG. 4, pages are allocated, starting with a left end sheet (top sheet) of the sheet collection 300. From the top side of the page, a monochrome sheet group M1 comprised of two monochrome sheets, a color sheet group C1 comprised of three color sheets, a monochrome sheet group M2 comprised of four monochrome sheets, a color sheet group C2 comprised of one color sheet, a monochrome sheet group M3 comprised of three monochrome sheets, a color sheet group C3 comprised of four color sheets, and a monochrome sheet group M4 comprised of three monochrome sheets are formed in this order.

First, focusing on the first color sheet group C1 and the next color sheet group C2 when viewed from the page top side, and the monochrome sheet group M2 sandwiched by the color sheet groups C1 and C2, it is judged whether or not a count of monochrome sheets in the monochrome sheet group M2 sandwiched by the two color sheet groups C1 and C2 is equal to or smaller than a predetermined value.

Figure 5:
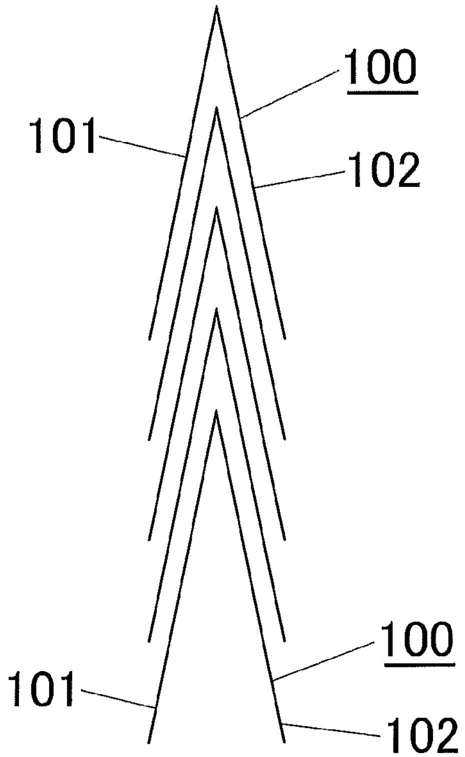
FIG. 5 is a view for illustrating an upper limit value of papers that can be saddle-stitched.

In the embodiment, a predetermined value refers to a count of sheets to be obtained by subtracting four from an upper limit value of sheets that can be saddle-stitched. As shown in FIG. 5, when an upper limit value of sheets that can be saddle-stitched is 10 sheets (20 pages), for example, a predetermined value is 6. If a count of monochrome sheets in the monochrome sheet group M2 exceeds the predetermined value, implementation of saddle-stitching itself may be impossible, and thus a predetermined value must be set to prevent this.

If the count of monochrome sheets in the monochrome sheet group M2 is equal to or smaller than the predetermined value, it is judged whether the count of monochrome sheets in the monochrome sheet group M2 is even or odd.

If the count is odd, there will be one monochrome sheet left when two sheets each of the monochrome sheets in the monochrome sheet group M2 are formed by one saddle-stitched paper. Thus, there is no effect of reducing a count of color-printed papers. Consequently, if the count of sheets from the top sheet to the last sheet of the monochrome sheet group M2 is even, respective sheets from the top sheet to a last sheet of the monochrome sheet group M2 are determined to be sheets of an adhesive bound group, and these sheets are formed by papers for adhesive binding. Specifically, these sheets are formed by an adhesive bound channel wherein one channel is comprised of two sheets (four pages) made by center-folding one paper. However, when the count of sheets from the top sheet to the last sheet of the monochrome sheet group M2 is odd, respective sheets to a sheet immediately before the last sheet of the monochrome sheet group M2 are determined to be a sheet of the adhesive bound group.

In addition, if the count of monochrome sheets in the monochrome sheet group M2 exceeds the predetermined value, a similar process is performed. Specifically, when the count of respective sheets from the top sheet to the last sheet of the monochrome sheet group M2 is even, these sheets are determined to be sheets of an adhesive bound group, and formed by papers for adhesive binding. To the contrary, when the count of the sheets from the top sheet to the last sheet of the monochrome sheet group M2 is odd, respective sheets to the sheet immediately before the last sheet of the monochrome sheet group M2 are determined to be sheets of the adhesive bound group.

In addition, if no monochrome sheet group sandwiched by two color sheet groups exists, all sheets are determined to be of the adhesive bound group.

On the other hand, when the count of the monochrome sheets of the monochrome sheet group M2 sandwiched by the color sheet groups C1 and C2 is even, it is further determined whether or not the count of sheets from the top to the sheet immediately before the monochrome sheet group M2, i.e., a total count of sheets of the monochrome sheet group M1 and the color sheet group C1 in the example of FIG. 4, is odd or even.

Figure 6A:
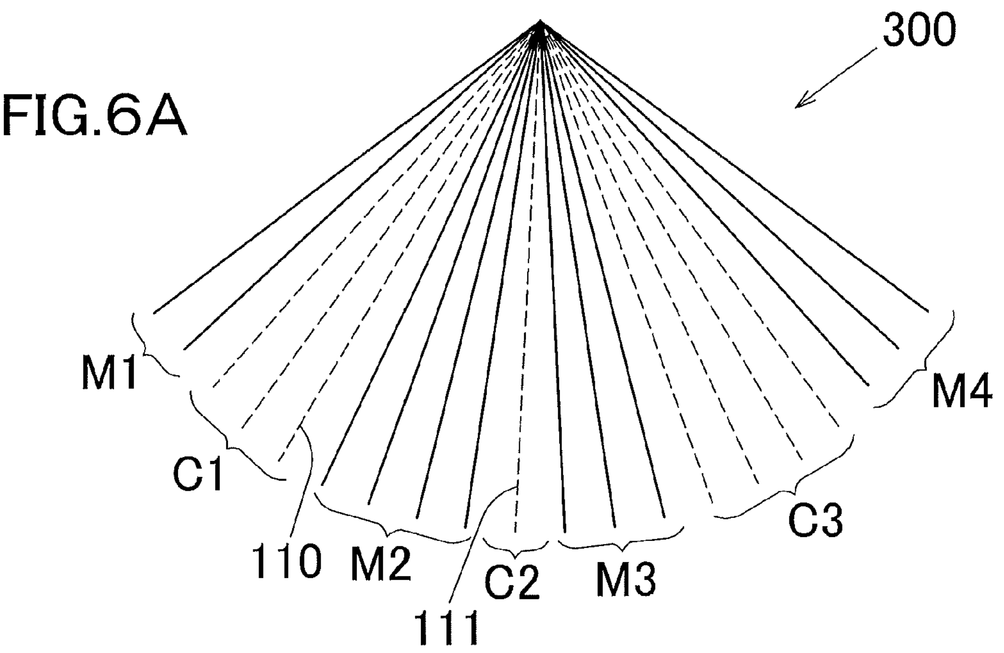
FIG. 6 is a view for showing a method for determining sheets of a saddle-stitched group and an adhesive bound group if a count of sheets from a top of a sheet collection to a monochrome sheet group M2 is odd.
Figure 6B:
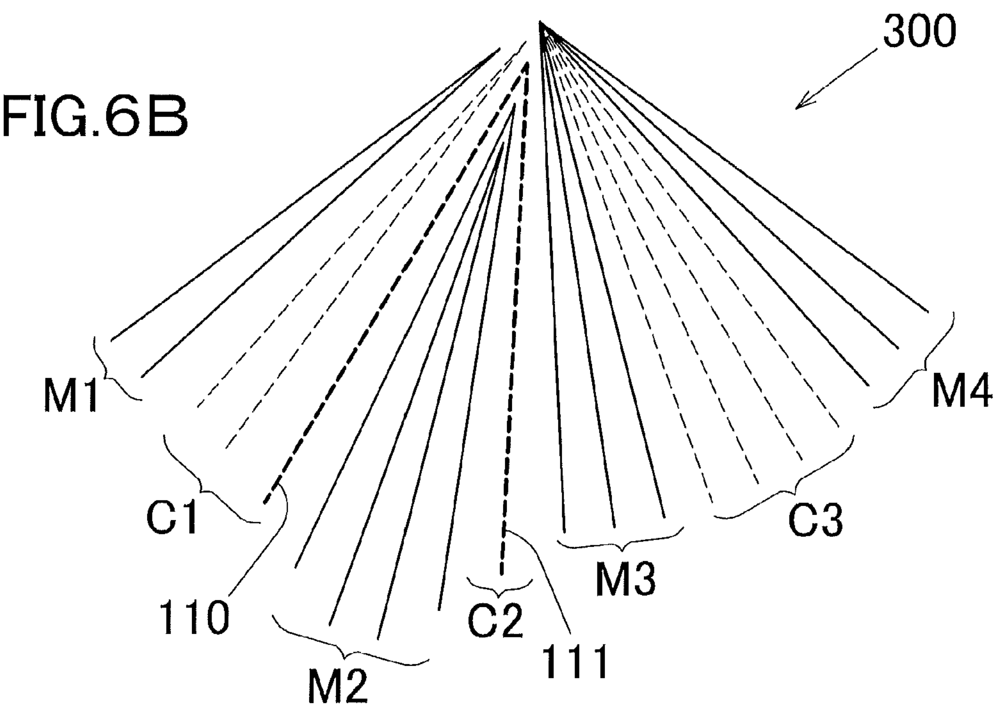

As shown in FIG. 6A, if the count of sheets from the top to the sheet immediately before the monochrome sheet group M2 is odd (5 sheets in this example), as shown in FIG. 6B, respective sheets of the monochrome sheet group M2 and each one color sheet 110, 111 which lies before and after the monochrome sheet group M2 and sandwiches the monochrome sheet group M2 are determined to be sheets of the saddle-stitched group, and formed by papers for saddle-stitching. Specifically, these sheets are formed by one saddle-stitched channel which has been prepared by being piled in a thickness direction and center-folded after being printed.

Figure 7A:
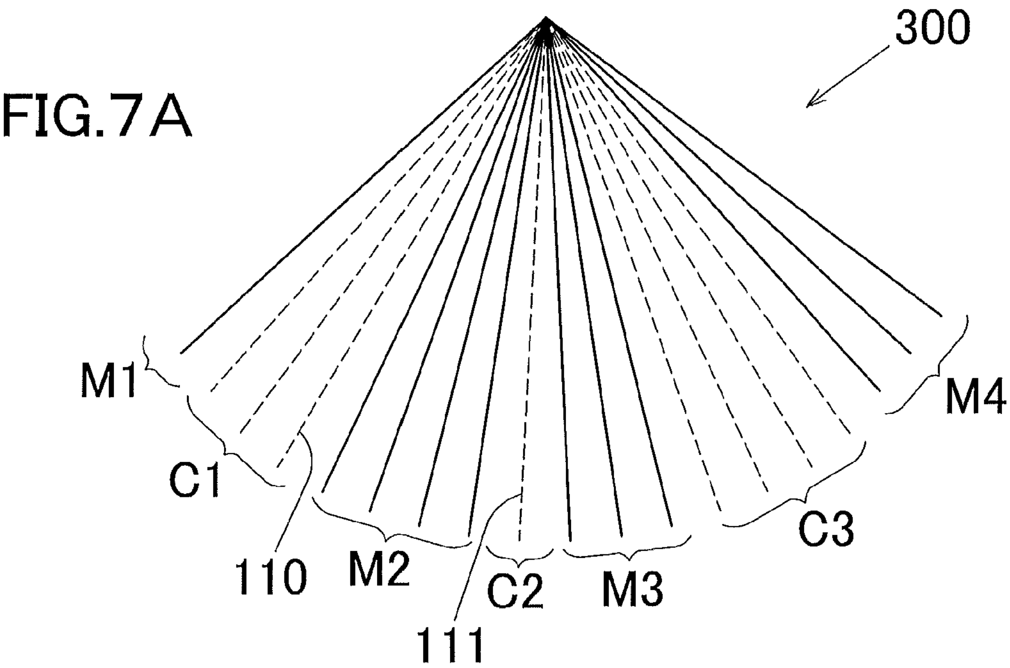
FIG. 7 is a view for showing a method for determining sheets of a saddle-stitched group and an adhesive bound group if a count of sheets from a top of a sheet collection to a monochrome sheet group M2 is even.
Figure 7B:
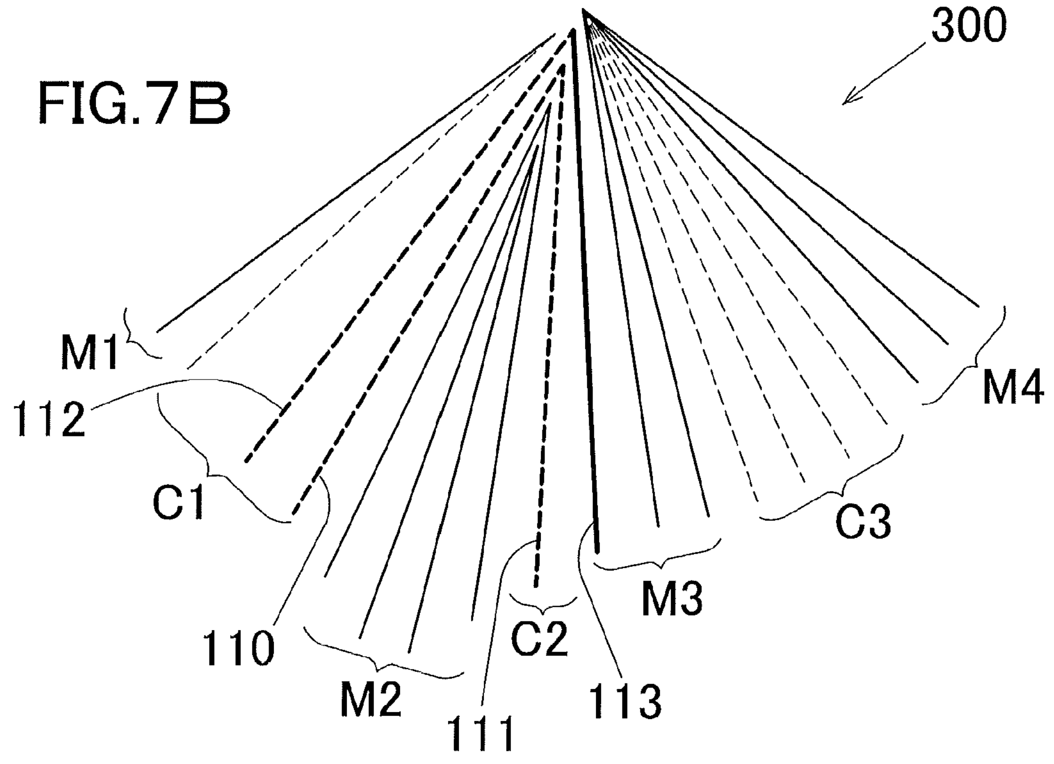

On the other hand, as shown in FIG. 7A, when the count of the sheets from the top to the sheet immediately before the monochrome sheet group M2 is even (four sheets in this case), as shown in FIG. 7B, the respective sheets in the monochrome sheet group M2 and each two sheets 110, 111, 112, 113, which lie before or after the monochrome sheet group M2 and sandwich the monochrome sheet group M2 are determined to be sheets of the saddle-stitched group, and formed by papers for saddle-stitching. In addition, although there are each two sheets before and after the monochrome sheet group M2, the count of sheets may be even, such as four sheets or more each, before and after the monochrome sheet group M2.

In addition, sheets which exist more on the top side than the sheets determined to be of the saddle-stitched group are determined to be sheets of the adhesive bound group, as shown in FIG. 6B and FIG. 7B.

With such a process, for an even count of the monochrome sheets of the monochrome sheet group M2, which is the saddle-stitched group, papers for saddle-stitching which form these sheets can be monochrome-printed, while for each one color sheet 110, 111 before and after the monochrome sheet group M2, one paper which forms these sheets may be color-printed.

In contrast, if each sheet of the monochrome sheet group M2 and each one color sheet 110, 111 before and after the monochrome sheet group M2 were center-folded and adhesive bound individually, each color sheet 110, 111 and first and last monochrome sheets in the monochrome sheet group M2 would be formed by each one paper. In this case, since these papers need to be color-printed, color-printing of a total of two papers would be needed. Consequently, the present invention can reduce a count of color-printed papers more reliably, and contribute to cost reduction.

Yet, when the count of sheets from the top to the sheet immediately before the monochrome sheet group M2 is odd, the respective sheets in the monochrome sheet group M2 and each one color sheet 110, 111 which lie before and after the monochrome sheet group M2 and sandwich the monochrome sheet group M2 are determined to be sheets of a saddle stitched group. When the count of sheets from the top to the sheet immediately before the monochrome sheet group M2 is even, the respective monochrome sheets in the monochrome sheet group M2 and at least two each sheets 110, 111, 112, 113, which lie before and after and sandwich the monochrome sheet group M2 are determined to be sheets of saddle-stitched group. Thus, the count of sheets from the top sheet to the sheet immediately before the saddle-stitched group is even without fail, and all of these sheets can be formed by papers for adhesive binding After sheets of the saddle-stitched group and adhesive bound group are determined, for each sheet whose group has not yet been determined, on the rear end side of the sheet collection, a saddle-stitched group or adhesive bound group are determined with a similar procedure.

In this manner, sheets of the saddle-stitched group or the adhesive bound group are sequentially determined from the top of the sheet collection 300. Then, a group is determined for all sheets, papers which form sheets on which respective pages are arranged are determined, and pages to be allocated to each paper are determined.

FIG. 8 is a view for illustrating the effect of an imposition process in the embodiment.

Figures 8A, 8B:
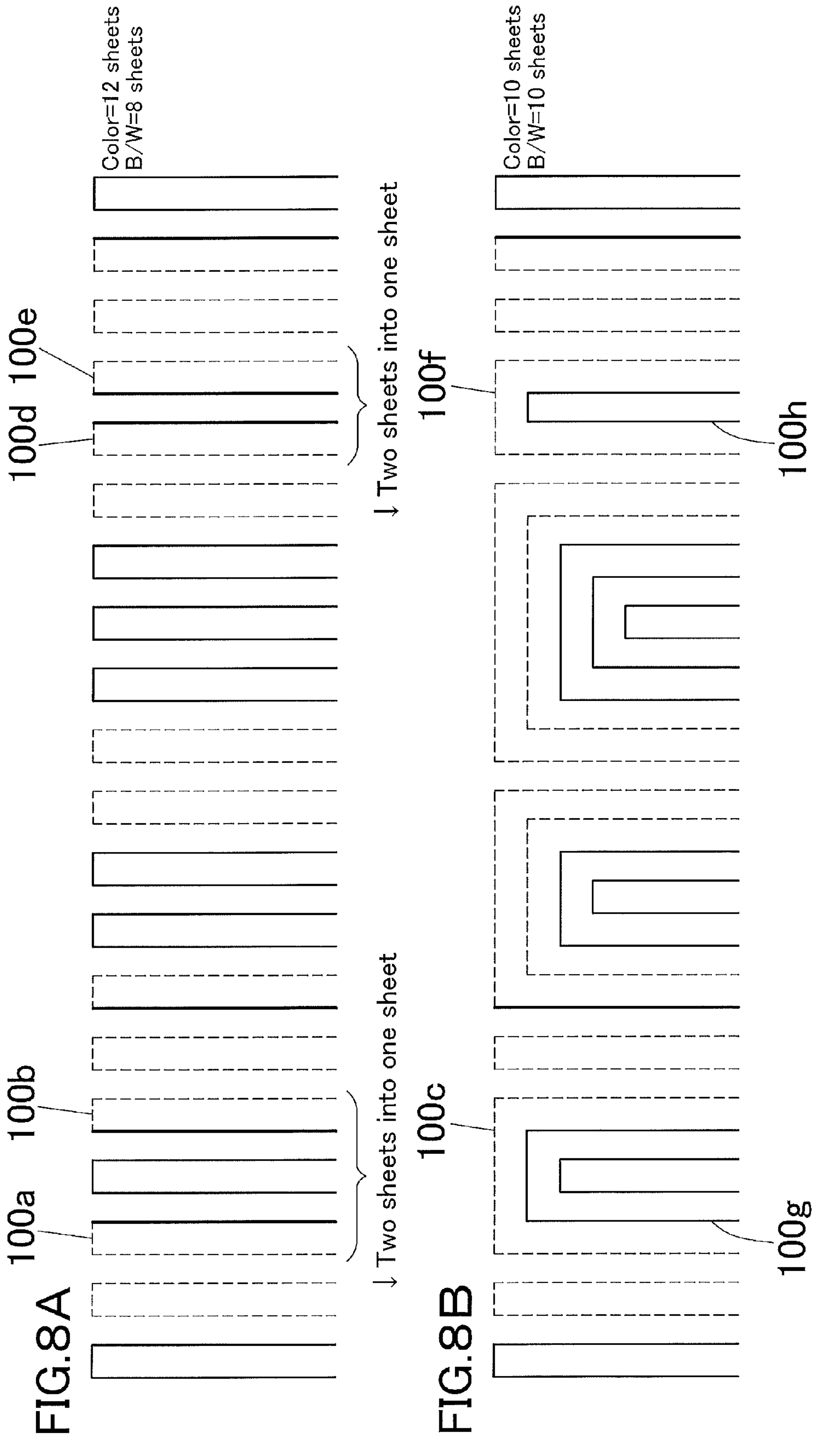
FIG. 8 is a view for showing the effect of an imposition process in the embodiment.

FIG. 8A shows a sheet collection configured by 20 papers each of which is doubled over and adhesive bound. FIG. 8B shows a sheet collection configured by combining a saddle-stitched channel and an adhesive bound channel with an imposition method according to the embodiment. In addition, in FIG. 8, a solid line shows a monochrome sheet which has a monochrome page on front and back pages, and a dash line shows a color sheet which has a color page on at least one of the front and back pages. A thick solid line shows a monochrome sheet when one sheet of one paper is a color sheet.

In the sheet collection of FIG. 8A, papers 100*a*, 100*b*, 100*d*, 100*e* are comprised of monochrome sheets and color sheets. Thus, these four papers need to be color-printed. In contrast to this, in the sheet collection of FIG. 8B, each monochrome sheet of the paper 100*a*, 100*b* is integrated into one saddle-stitched paper 100*g*, and each color sheet is integrated into one saddle-stitched paper 100*c*. Similarly, each monochrome sheet of the paper 100*d*, 100*e* is integrated into one paper 100*h* for saddle-stitching, and each color sheet is integrated into one paper 100*f* for saddle-stitching.

Consequently, while the count of color-printed papers is 12 and that of monochrome-printed papers (B/W) is 8 in the sheet collection of FIG. 8A, the count of color-printed papers is 10 and that of monochrome-printed papers (B/W) is 10 in the sheet collection of FIG. 8B. Thus, the sheet collection of FIG. 8B can reduce the number of color-printed papers by two papers compared with the sheet collection of FIG. 8A, thereby being able to contribute to cost reduction.

Figure 9:
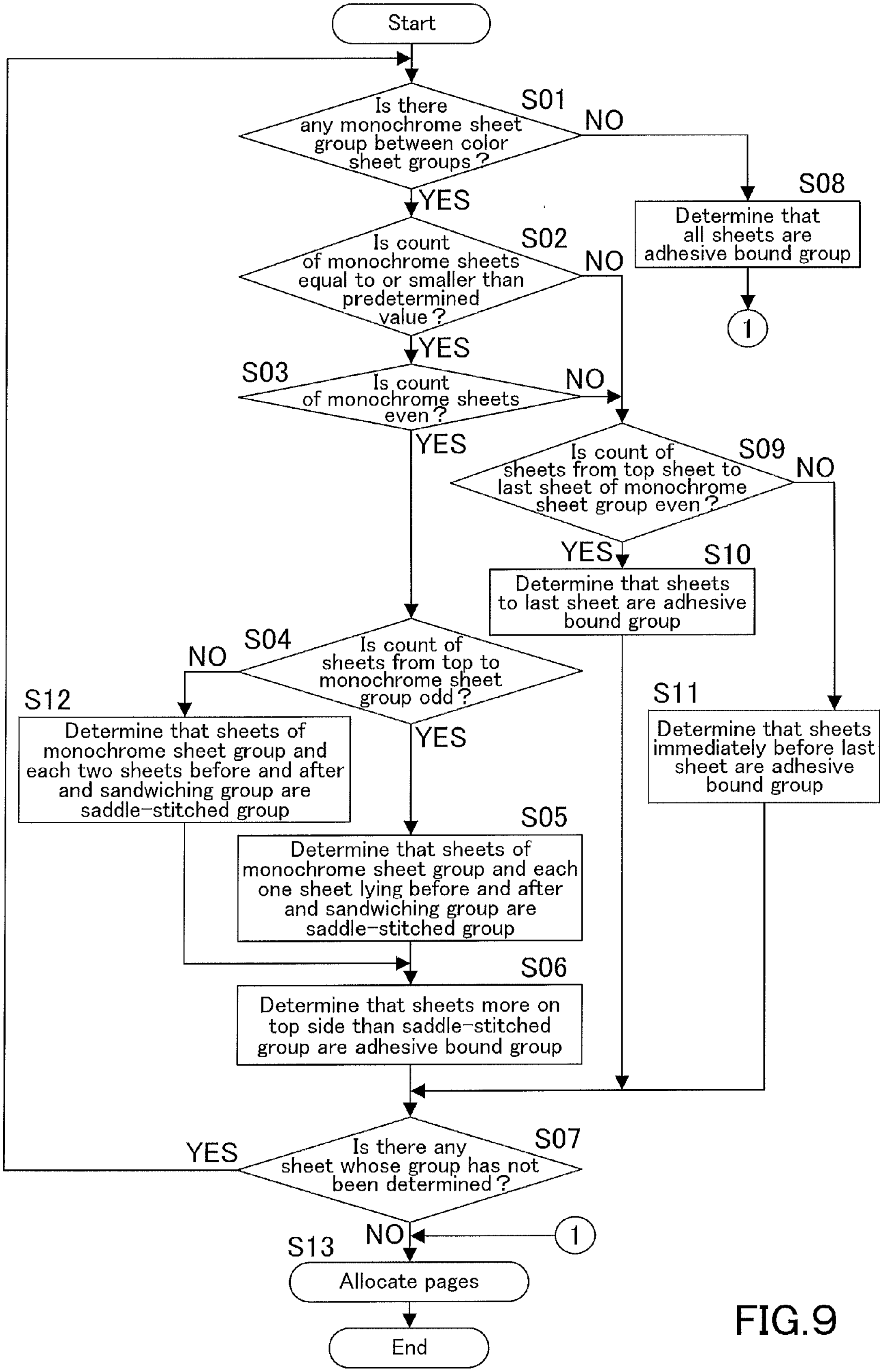
FIG. 9 is a flow chart showing the above-mentioned imposition process to be performed by a CPU of the information processor.

FIG. 9 is a flow chart showing the imposition process to be performed by the CPU 11 of the information processor 1. The process is executed when the CPU 11 operates in accordance with an operating program recorded in a recording medium such as the ROM 12 and the like.

In step S01, it is judged for a sheet collection, if a monochrome sheet group exists between two color sheet groups. If not (NO in step S01), in step S08, it is judged that all sheets are of an adhesive bound group and the process ends.

If a monochrome sheet group exists (YES in step S01), in step S02, it is judged if a count of monochrome sheets in the monochrome sheet group is equal to or smaller than a predetermined value. If it is not equal to or smaller than the predetermined value (NO in step S02), the process proceeds to step S09. If it is equal to or smaller than the predetermined number (YES in step S02), in step S03, it is judged whether or not the count of monochrome sheets in the monochrome sheet group is even. If it is not even (NO in step S03), the process proceeds to step S09. If it is even (YES in step S03), the process proceeds to step S04.

In step S09, it is judged if the count of sheets from a top sheet of the sheet collection to a last sheet of the monochrome sheet group is even. If the count is even (YES in step S09), the process proceeds to step S07 after it is determined in step S10 that the sheets from the top sheet of the sheet collection to the last sheet of the monochrome sheet group are sheets for an adhesive bound group. If it is odd (NO in step S09), the process proceeds to step S07 after it is determined in step S11 that sheets from the top sheet of the sheet collection to a sheet immediately before the last sheet of the monochrome sheet group are sheets for the adhesive bound group.

On the other hand, in step S04, it is judged whether the count of sheets from the top of the sheet collection to a sheet immediately before the monochrome sheet group M2 is odd. If it is odd (YES in step S04), it is determined that the sheets in the monochrome sheet group and each one color sheet which lies before and after and sandwiches the monochrome sheet group are of a saddle-stitched group in step S05, and then the process proceeds to step S06. If it is even (NO in step S04), it is determined that the sheets in the monochrome sheet group and each two color sheets which lie before and after and sandwich the monochrome sheet group are of a saddle-stitched group in step S12, and then the process proceeds to step S06.

In step S06, after it is determined that sheets which exist more on the top side than those determined to be of the saddle-stitched group are of the adhesive bound group, the process proceeds to step S07.

In step S07, it is judged whether or not there is any sheet which has not been determined to be of either the adhesive bound group or the saddle-stitched group. If there is any sheet whose group has not been determined (YES in step S07), the process returns to step S01, and for the sheet whose group has not been determined, the process from step S01 is repeated toward the rear end of the sheet collection till there is no sheet whose group has not been determined.

When there is no longer any sheet whose group has not been determined (NO in step S07), in step S13, pages are allocated to papers which form sheets, and the process ends.

Figure 10:
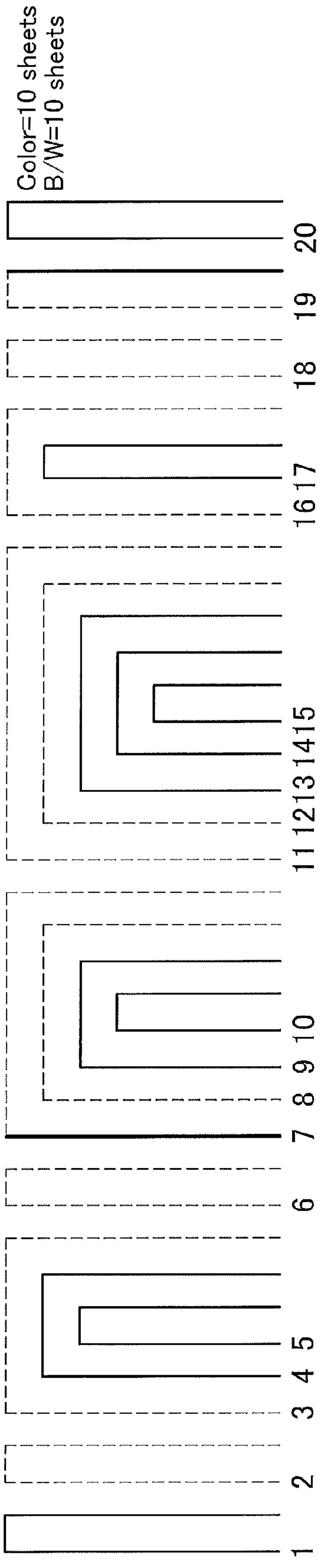
FIG. 10 is a view in which numbers are assigned to 20 papers to be used in the sheet collection as shown in FIG. 8B.

FIG. 10 shows 20 papers to be used in the sheet collection in FIG. 8B to which numbers have been assigned, and the papers 2, 3, 6, 7, 8, 11, 12, 16,18, and 19 are color-printed while other papers are monochrome-printed.

Figure 11:
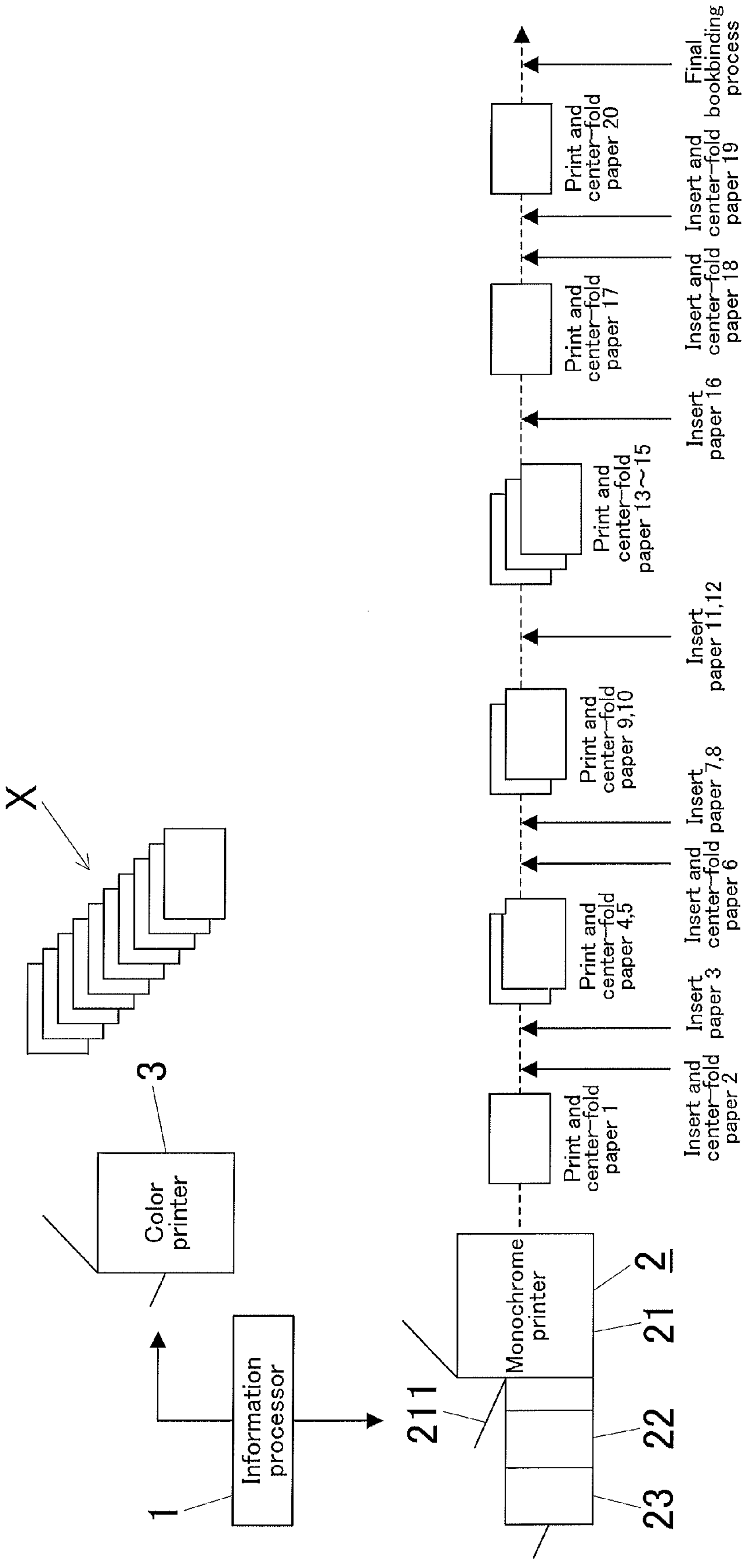
FIG. 11 is a view for illustrating a book binding process of a sheet collection that uses the printing system of FIG. 1.

Now, in a printing system shown in FIG. 11, an information processor 1 transmits to a color printer 3 color image data of four pages corresponding to each of the ten papers to be color-printed. The color printer 3 prints the transmitted image data of four pages on papers and creates a group X of ten color-printed papers.

The group X of color-printed papers is set in a PI tray 211 of a monochrome printer 2.

To the monochrome printer 2, the information processor 1 transmits monochrome image data of four pages corresponding to each of ten papers to be monochrome-printed. Then, the following process is carried out on the ten papers to be monochrome-printed and the ten color-printed papers set in the PI tray 211, which are then bound to a sheet collection.

Specifically, as shown in FIG. 11, the monochrome printer 2 first performs monochrome-printing on a paper 1, and a center-folding machine 22 center-folds the paper 1 and prepares an adhesive bound channel. Then, the center-folding machine 22 inserts a paper 2 on the PI tray 211 into the monochrome printer 2, center-folds it, and prepares an adhesive bound channel.

Next, the center-folding machine 22 inserts a paper 3 on the PI tray 211, puts monochrome-printed papers 4 and 5 on the paper 2, center-folds them, and prepares a saddle-stitched channel. Then, after the center-folding machine 22 inserts a paper 6 on the PI tray 211, center-folds it, and prepares an adhesive bound channel, it inserts papers 7 and 8 on the PI tray 211, puts monochrome-printed papers 9 and 10 on the papers 7 and 8, center-folds them, and creates a saddle-stitched channel.

Then, the center-folding machine 22 inserts papers 11 and 12 on the PI tray 211, puts monochrome-printed papers 13 to 15 on the papers 11 and 12, center-folds them, and creates a saddle-stitched channel.

Furthermore, the center-folding machine 22 inserts a paper 16 on the PI tray 211, puts a monochrome-printed paper 17 on the paper 16, center-folds them, and creates a saddle-stitched channel.

Then, after the center-folding machine 22 sequentially inserts papers 18 and 19 on the PI tray 211, center-folds each of them, and creates an adhesive bound channel, it center-folds a monochrome-printed paper 20, and creates an adhesive bound channel.

A final bookbinding process is performed on the adhesive bound channels and the saddle-stitched channels which have been thus prepared, and fixing of a back section 100*a* and the like is performed.

Each process such as insertion, adhesive binding, and saddle-stitching of monochrome-printed or color-printed papers described above is performed based on a print command which indicates result of an imposition process and which is transmitted from the information processor 1 to the monochrome printer 2.

Although one embodiment of the present invention has been described so far, the present invention is not limited to the above embodiment.

For example, although it is determined if sheets are a saddle-stitched group or an adhesive bound group based on whether or not a monochrome sheet group exists between two color sheet groups, it may be determined based on whether or not a color sheet group exists between two monochrome sheet groups. In this case, the same effect can also be achieved.

In addition, although the case in which the monochrome printer 2 and the color printer 3 are used has been described, one printer which can be used by switching monochrome-printing and color-printing may also be used.

The present invention having been described above may be applied to the following modes.

[1] An information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, the information processor comprising:

a first sheet count judging section for judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

a second sheet count judging section for judging whether a count of sheets from the one end of the sheet collection to a sheet immediately before the monochrome sheet group is odd or even, if the first sheet count judging section judges that the count of the monochrome sheets in the monochrome sheet group is even;

a determination section for not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the monochrome sheet group is odd, and if the second sheet count judging section judges that the count of sheets from the one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers.

[2] The information processor according to the aforementioned item [1], comprising:

a third judging section for judging whether a count of respective sheets from a sheet at the one end of the sheet collection to the last sheet of the monochrome sheet group is odd or even, if the first sheet count judging section judges that the count of the monochrome sheets in the monochrome sheet group is odd, wherein the determination section determines that respective sheets to the last sheet of the monochrome sheet group are sheets of an adhesive bound group when the third judging section judges that the count of the respective sheets to the last sheet of the monochrome sheet group is even, and that respective sheets to the sheet immediately before the last sheet of the monochrome sheet group are sheets of an adhesive bound group when the third judging section judges that the count is odd.

[3] The information processor according to the aforementioned item [1] or [2], wherein the first sheet count judging section further judges whether or not the count of the monochrome sheets in the monochrome sheet group is equal to or smaller than a predetermined value, and the determination section judges that these monochrome sheets are sheets of a saddle-stitched group when the count of monochrome sheets is equal to or smaller than the predetermined value.

[4] A printing system, comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor comprises:

a first sheet count judging section for judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

a second sheet count judging section for judging whether a count of sheets from the one end of the sheet collection to a sheet immediately before the monochrome sheet group is odd or even, if the first sheet count judging section judges that the count of the monochrome sheets in the monochrome sheet group is even;

a determination section for not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the monochrome sheet group is odd, and if the second sheet count judging section judges that the count of sheets from the one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting image data of corresponding four pages to the first printing device when image data of all pages is monochrome image data and to the second printing device when image data of at least one page is color image data, so that the sheets of the saddle-stitched group or the adhesive bound group determined by the determination section are formed by respective papers, wherein the first and second printing devices print on papers the image data transmitted from the information processor.

[5] The printing system according to the aforementioned item [4], comprising:

a third judging section for judging whether a count of respective sheets from a sheet at the one end of the sheet collection to the last sheet of the monochrome sheet group is odd or even, if the first sheet count judging section of the information processor judges that the count of the monochrome sheets in the monochrome sheet group is odd, wherein the determination section determines that respective sheets to the last sheet of the monochrome sheet group are sheets of an adhesive bound group when the third judging section judges that the count of the respective sheets to the last sheet of the monochrome sheet group is even, and that respective sheets to the sheet immediately before the last sheet of the monochrome sheet group are sheets for an adhesive bound group when the third judging section judges that the count is odd.

[6] The printing system according to the aforementioned item [4] or [5], wherein the first sheet count judging section of the information processor further judges whether or not the count of the monochrome sheets in the monochrome sheet group is equal to or smaller than a predetermined value, and the determination section judges that these monochrome sheets are sheets of a saddle-stitched group when the count of monochrome sheets is equal to or smaller than the predetermined value.

[7] A method for printing to be performed in a printing system comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor performs:

first sheet count judgment of judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

second sheet count judgment of judging whether a count of sheets from the one end of the sheet collection to a sheet immediately before the monochrome sheet group is odd or even, if it is judged in the first sheet count judgment that the count of the monochrome sheets in the monochrome sheet group is even;

determination of not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the monochrome sheet group is odd, and if it is judged in the second sheet count judgment that the count of sheets from one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting image data of corresponding four pages to the first printing device when image data of all pages is monochrome image data and to the second printing device when image data of at least one page is color image data, so that the sheets of the saddle-stitched group or the adhesive bound group determined in the determination are formed by respective papers, wherein the first and second printing devices performs printing on papers the image data transmitted from the information processor.

[8] A non-transitory recording medium in which an imposition process program for causing a computer of an information processor to be used when a sheet collection comprised of a plurality of sheets on which pages are arranged in order is prepared, by combining a plurality of papers on which printing is performed in the unit of four pages and which are center-folded by being doubled over with a back section as a center, and on which two sheets having each one page arranged on a front and a back are formed on both sides of the back section, to perform:

first sheet count judgment of judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

second sheet count judgment of judging whether a count of sheets from the one end of the sheet collection to a sheet immediately before the monochrome sheet group is odd or even, if it is judged in the first sheet count judgment that the count of the monochrome sheets in the monochrome sheet group is even;

determination of not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the monochrome sheet group is odd, and if it is judged in the second sheet count judgment that the count of sheets from one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting image data of corresponding four pages to the first printing device when image data of all pages is monochrome image data and to the second printing device when image data of at least one page is color image data, so that the sheets of the saddle-stitched group or the adhesive bound group determined in the determination are formed by respective papers.

[9] The non-transitory recording medium according to the aforementioned item [8], wherein the imposition process program causes the computer to perform third judgment of judging whether a count of respective sheets from the sheet at the one end of the sheet collection to the last sheet of the monochrome sheet group is odd or even, if it is judged in the first sheet count judgment of the information processor that the count of the monochrome sheets in the monochrome sheet group is odd, and in the determination, causes the computer to perform a process for determining that respective sheets to the last sheet of the monochrome sheet group are sheets of an adhesive bound group when it is judged in the third judgment that the count of the respective sheets to the last sheet of the monochrome sheet group is even and that the sheets to the sheet immediately before the last sheet of the monochrome sheet group are sheets of an adhesive bound group when it is judged that the count is odd.

[10] The non-transitory recording medium according to the aforementioned item [8] or [9], wherein the imposition process program causes the computer to perform a process for further judging in the first sheet count judgment whether the count of the monochrome sheets in the monochrome sheet group is equal to or smaller than a predetermined value, and for judging in the determination that these monochrome sheets are sheets of a saddle-stitched group, when the count of the monochrome sheets is equal to or smaller than the predetermined value.

[11] An information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, the information processor comprising:

a first sheet count judging section for judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

a second sheet count judging section for judging whether a count of sheets from the one end of the sheet collection to a sheet immediately before the color sheet group is odd or even, when the first sheet count judging section judges that the count of the color sheets in the color sheet group is even;

a determination section for not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the color sheet group is odd, and if the second sheet count judging section judges that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers.

[12] The information processor according to the aforementioned item [11], comprising:

a third judging section for judging whether a count of respective sheets from a sheet at the one end of the sheet collection to the last sheet of the color sheet group is odd or even, if the first sheet count judging section judges that the count of the color sheets in the color sheet group is odd, wherein the determination section determines that respective sheets to the last sheet of the color sheet group are sheets of an adhesive bound group when the third judging section judges that the count of the respective sheets to the last sheet of the color sheet group is even, and that respective sheets to the sheet immediately before the last sheet of the color sheet group are sheets for an adhesive bound group when the third judging section judges that the count is odd.

[13] The information processor according to the aforementioned item [11] or [12], wherein the first sheet count judging section further judges whether or not the count of the color sheets in the color sheet group is equal to or smaller than a predetermined value, and the determination section judges that these color sheets are sheets of a saddle-stitched group when the count of the color sheets is equal to or smaller than the predetermined value.

[14] A printing system, comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor comprises:

a first sheet count judging section for judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

a second sheet count judging section for judging whether a count of sheets from the one end of the sheet collection to a sheet immediately before the color sheet group is odd or even, when the first sheet count judging section judges that the count of the color sheets in the color sheet group is even;

a determination section for not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the color sheet group is odd, and if the second sheet count judging section judges that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers, wherein the first and second printing devices print on papers the image data transmitted from the information processor.

[15] The printing system according to the aforementioned item [14], comprising:

a third judging section for judging whether a count of respective sheets from a sheet at the one end of the sheet collection to the last sheet of the color sheet group is odd or even, if the first sheet count judging section of the information processor judges that the count of the color sheets in the color sheet group is odd, wherein the determination section determines that respective sheets to the last sheet of the color sheet group are sheets of an adhesive bound group when the third judging section judges that the count of the respective sheets to the last sheet of the color sheet group is even, and that the respective sheets to the sheet immediately before the last sheet of the color sheet group are sheets for an adhesive bound group when the third judging section judges that the count is odd.

[16] The printing system according to the aforementioned item [14] or [15], wherein the first sheet count judging section of the information processor further judges whether or not the count of the color sheets in the color sheet group is equal to or smaller than a predetermined value, and the determination section judges that these color sheets are sheets of a saddle-stitched group when the count of the color sheets is equal to or smaller than the predetermined value.

[17] A method for printing to be performed in a printing system comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor performs:

first sheet count judgment of judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

second sheet count judgment of judging whether a count of sheets from the one end of the sheet collection to a sheet immediately before the color sheet group is odd or even, when it is judged in the first sheet count judgment that the count of the color sheets in the color sheet group is even;

determination of not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the color sheet group is odd, and if it is judged in the second sheet count judgment that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting to one or more printing devices image data of corresponding four pages as monochrome image data if image data of all pages is monochrome image data and as color image data if image data of at least one page is color image data, so that the sheets of the saddle-stitched group or the adhesive bound group determined in the determination are formed by respective papers, and wherein the first and second printing devices perform printing on papers the image data transmitted from the information processor.

[18] A non-transitory recording medium in which an imposition process program for causing a computer of an information processor to be used when a sheet collection comprised of a plurality of sheets on which pages are arranged in order is prepared, by combining a plurality of papers on which printing is performed in the unit of four pages and which are center-folded by being doubled over with a back section as a center, and on which two sheets having each one page arranged on a front and a back are formed on both sides of the back section, to perform:

first sheet count judgment of judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

second sheet count judgment of judging whether a count of sheets from the one end of the sheet collection to a sheet immediately before the color sheet group is odd or even, when it is judged in the first sheet count judgment that the count of the color sheets in the color sheet group is even;

determination of not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the color sheet group is odd, and if it is judged in the second sheet count judgment that the count of the sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting to one or more printing devices image data of corresponding four pages as monochrome image data if image data of all pages is monochrome image data and as color image data if image data of at least one page is color image data, so that the sheets of the saddle-stitched group or the adhesive bound group determined in the determination are formed by respective papers.

[19] The non-transitory recording medium according to the aforementioned item [18], wherein the imposition process program causes the computer to perform third judgment of judging whether a count of respective sheets from the sheet at the one end of the sheet collection to the last sheet of the color sheet group is odd or even, when it is judged in the first sheet count judgment of the information processor that the count of the color sheets in the color sheet group is odd, and in the determination, causes the computer to perform a process for determining that respective sheets to the last sheet of the color sheet group are sheets of an adhesive bound group when it is judged in the third judgment that the count of the respective sheets to the last sheet of the color sheet group is even and that the sheets to the sheet immediately before the last sheet of the color sheet group are sheets of an adhesive bound group when it is judged that the count is odd.

[20] The non-transitory recording medium according to the aforementioned item [18] or [19], wherein the imposition process program causes the computer to perform a process for further judging in the first sheet count judgment whether the count of the color sheets in the color sheet group is equal to or smaller than a predetermined value, and for judging in the determination that these color sheets are sheets of a saddle-stitched group, when the count of the color sheets is equal to or smaller than the predetermined value.

According to the aspects of the invention described in the previous items [1], [4], and [7], in the sheet collection planned to be prepared, if a count of monochrome sheets in a monochrome sheet group is even and a count of sheets from one end of the sheet collection to a sheet immediately before the monochrome sheet group is odd when there exists the monochrome sheet group comprised of one or more consecutive monochrome sheets all of whose front and back sides are monochrome pages, between a first color sheet group when viewed from one end of the sheet collection and a next color sheet group, of color sheet groups comprised of one or more consecutive color sheets having a color page on at least one of whose front and back sides, the sheets in the monochrome sheet group and each one color sheet which lies before and after and sandwiches the monochrome sheet group are determined to be saddle-stitched sheets formed by papers for saddle-stitching. On the other hand, if the count of sheets from the one end of the sheet collection to the sheet immediately before the monochrome sheet group is even, the sheets in the monochrome sheet group and at least two sheets each which lie before and after and sandwich the monochrome sheet group are determined to be sheets of a saddle-stitched group. In addition, in both cases, sheets lying more on the one end of the sheet collection than the sheets determined to be of the saddle-stitched group are determined to be sheets of an adhesive bound group. Then, this process is sequentially performed to the other end of the sheet collection and to sheets whose group has not been determined, and each sheet in the sheet collection is determined to be a sheet of the saddle-stitched group or a sheet of the adhesive bound group.

Thus, for an even count of monochrome sheets of the monochrome sheet group in one saddle-stitched group, papers forming the sheets can be monochrome-printed. For one color sheet each before and after the monochrome sheet group, one paper forming the sheets may be color-printed. In contrast, when sheets of a saddle-stitched group are formed by papers each of which is center-folded and adhesive bound, in some cases, each color sheet and a monochrome sheet at the end of the monochrome sheet group are each formed by one paper. In this case, since these sheets need to be color-printed, color-printing of a total of two sheets is needed. As a result, the present invention can reduce more counts of color-printed papers, thus being able to contribute to cost reduction.

According to the aspects of the invention described in the previous items [2] and [5], when it is judged that a count of monochrome sheets in a monochrome sheet group is odd, the effect of reducing a count of color-printed papers cannot be achieved even if the sheets are formed by saddle-stitched papers. Thus, if a count of respective sheets from a sheet at one end of a sheet collection to a last sheet in the monochrome sheet group is even, the respective sheets to the last sheet in the monochrome sheet group are formed by adhesive bound papers, while if the count is odd, respective sheets to a sheet immediately before the last sheet of the monochrome sheet group are formed by adhesive bound papers.

According to the aspects of the invention described in the previous items [3] and [6], a count of sheets in a saddle-stitched group can be prevented from exceeding an upper limit value.

According to the aspect of the invention described in the previous item [8], it is possible to cause a computer of an information processor to perform an imposition process capable of reducing a count of color-printed papers and contributing to cost reduction.

According to the aspect of the invention described in the previous item [9], it is possible to cause a computer of an information processor to further perform a process for determining that respective sheets to a last sheet of a monochrome sheet group are sheets of an adhesive bound group if it is judged in the third judging step of judging whether a count of the respective sheets to the last sheet of the monochrome sheet group is odd or even that a count of respective sheets from a sheet at one end of a sheet collection to the last sheet of the monochrome sheet group is even, and that respective sheets to a sheet immediately before the last sheet of the monochrome sheet group are sheets of the adhesive bound group if it is judged that the count is odd.

According to the aspect of the invention described in the previous item [10], it is possible to cause a computer of an information processor to further perform a process for preventing a count of sheets in a saddle-stitched group from exceeding an upper limit value.

According to the aspects of the invention described in the previous items [11], [14], and [17], a count of color-printed papers can be reduced, thus being able to contribute to cost reduction.

According to the aspects of the invention described in the previous items [12] and [15], when it is judged that a count of color sheets in a color sheet group is odd, the effect of reducing a count of color-printed papers cannot be achieved even if the sheets are formed by saddle-stitched papers. Thus, if a count of respective sheets from a sheet at one end of a sheet collection to a last sheet of the color sheet group is even, the respective sheets to the last sheet in the color sheet group are formed by adhesive bound papers, while the count is odd, respective sheets to a sheet immediately before the last sheet of the color sheet group are formed by adhesive bound papers.

According to the aspects of the invention described in the previous items [13] and [16], a count of sheets in a saddle-stitched group can be prevented from exceeding an upper limit value.

According to the aspect of the invention described in the previous item [18], it is possible to cause a computer of an information processor to perform an imposition process capable of reducing a count of color-printed papers and contributing to cost reduction.

According to the aspect of the invention described in the previous item [19], it is possible to cause a computer of an information processor to further perform a process for determining that respective sheets to a last sheet of a color sheet group are sheets of an adhesive bound group if it is judged in the third judging step of judging whether a count of the respective sheets to the last sheet of the color sheet group is odd or even that a count of respective sheets to the last sheet of the color sheet group is even, and that respective sheets to a sheet immediately before the last sheet of the color sheet group are sheets of the adhesive bound group if it is judged that the count is odd.

According to the aspect of the invention described in the previous item [20], it is possible to cause a computer of an information processor to further perform a process for preventing a count of sheets in a saddle-stitched group from exceeding an upper limit value.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term “preferably” is non-exclusive and means “preferably, but not limited to”. In this disclosure and during the prosecution of this application, means-plus-function or step-plus-function limitations will only be employed where for a specific claim limitation all of the following conditions are present In that limitation: a) “means for” or “step for” is expressly recited; b) a corresponding function is expressly recited; and c) structure, material or acts that support that structure are not recited. In this disclosure and during the prosecution of this application, the terminology “present invention” or “invention” may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology “embodiment” can be used to describe any aspect, feature, process or step, any combination thereof, and/or any portion thereof, etc. In some examples, various embodiments may include overlapping features. In this disclosure and during the prosecution of this case, the following abbreviated terminology may be employed: “e.g.” which means “for example”, and “NB” which means “note well”.

What is claimed is:

1. An information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, the information processor comprising:

a first sheet count judging section for judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

a second sheet count judging section for judging whether a count of sheets from the one end of the sheet collection to a sheet immediately before the monochrome sheet group is odd or even, if the first sheet count judging section judges that the count of the monochrome sheets in the monochrome sheet group is even;

a determination section for not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the monochrome sheet group is odd, and if the second sheet count judging section judges that the count of sheets from the one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers.

2. The information processor according to claim 1, comprising:

a third judging section for judging whether a count of respective sheets from a sheet at the one end of the sheet collection to the last sheet of the monochrome sheet group is odd or even, if the first sheet count judging section judges that the count of the monochrome sheets in the monochrome sheet group is odd, wherein the determination section determines that respective sheets to the last sheet of the monochrome sheet group are sheets of an adhesive bound group when the third judging section judges that the count of the respective sheets to the last sheet of the monochrome sheet group is even, and that respective sheets to the sheet immediately before the last sheet of the monochrome sheet group are sheets of an adhesive bound group when the third judging section judges that the count is odd.

3. The information processor according to claim 1, wherein the first sheet count judging section further judges whether or not the count of the monochrome sheets in the monochrome sheet group is equal to or smaller than a predetermined value, and the determination section judges that these monochrome sheets are sheets of a saddle-stitched group when the count of monochrome sheets is equal to or smaller than the predetermined value.

4. A printing system, comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor comprises:

a first sheet count judging section for judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

a second sheet count judging section for judging whether a count of sheets from the one end of the sheet collection to a sheet immediately before the monochrome sheet group is odd or even, if the first sheet count judging section judges that the count of the monochrome sheets in the monochrome sheet group is even;

a determination section for not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the monochrome sheet group is odd, and if the second sheet count judging section judges that the count of sheets from the one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting image data of corresponding four pages to the first printing device when image data of all pages is monochrome image data and to the second printing device when image data of at least one page is color image data, so that the sheets of the saddle-stitched group or the adhesive bound group determined by the determination section are formed by respective papers, wherein the first and second printing devices print on papers the image data transmitted from the information processor.

5. The printing system according to claim 4, comprising:

a third judging section for judging whether a count of respective sheets from a sheet at the one end of the sheet collection to the last sheet of the monochrome sheet group is odd or even, if the first sheet count judging section of the information processor judges that the count of the monochrome sheets in the monochrome sheet group is odd, wherein the determination section determines that respective sheets to the last sheet of the monochrome sheet group are sheets of an adhesive bound group when the third judging section judges that the count of the respective sheets to the last sheet of the monochrome sheet group is even, and that respective sheets to the sheet immediately before the last sheet of the monochrome sheet group are sheets for an adhesive bound group when the third judging section judges that the count is odd.

6. The printing system according to claim 4, wherein the first sheet count judging section of the information processor further judges whether or not the count of the monochrome sheets in the monochrome sheet group is equal to or smaller than a predetermined value, and the determination section judges that these monochrome sheets are sheets of a saddle-stitched group when the count of monochrome sheets is equal to or smaller than the predetermined value.

7. A method for printing to be performed in a printing system comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor performs:

first sheet count judgment of judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between the first color sheet group when viewed from one end of the sheet collection and a next color sheet group of color sheet groups comprised of one or more consecutive color sheets on at least one of whose front and back sides a color page is arranged;

second sheet count judgment of judging whether a count of sheets from the one end of the sheet collection to a sheet immediately before the monochrome sheet group is odd or even, if it is judged in the first sheet count judgment that the count of the monochrome sheets in the monochrome sheet group is even;

determination of not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the monochrome sheet group is odd, and if it is judged in the second sheet count judgment that the count of sheets from one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting image data of corresponding four pages to the first printing device when image data of all pages is monochrome image data and to the second printing device when image data of at least one page is color image data, so that the sheets of the saddle-stitched group or the adhesive bound group determined in the determination are formed by respective papers, wherein the first and second printing devices performs printing on papers the image data transmitted from the information processor.

8. A non-transitory recording medium in which an imposition process program for causing a computer of an information processor to control a predetermined group of a first printing device and a second printing device when a sheet collection comprised of a plurality of sheets on which pages are arranged in order is prepared, by combining a plurality of papers on which printing is performed in the unit of four pages and which are center-folded by being doubled over with a back section as a center, and on which two sheets having each one page arranged on a front and a back are formed on both sides of the back section, to perform:

first sheet count judgment of judging whether a count of monochrome sheets in a monochrome sheet group is even or odd when in the sheet collection planned to be prepared, there exists the monochrome sheet group comprised of one or more consecutive monochrome sheets all of whose front and back sides are monochrome pages, between a first color sheet group when viewed from one end of the sheet collection and a next color sheet group of color sheet groups comprised of one or more consecutive color sheets on at least one of whose front and back sides a color page is arranged;

second sheet count judgment of judging whether a count of sheets from the one end of the sheet collection to a sheet immediately before the monochrome sheet group is odd or even, if it is judged in the first sheet count judgment that the count of the monochrome sheets in the monochrome sheet group is even;

determination of not only determining that the sheets in the monochrome sheet group and each one sheet lying before and after and sandwiching the monochrome sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the monochrome sheet group is odd, and if it is judged in the second sheet count judgment that the count of sheets from one end of the sheet collection to the sheet immediately before the monochrome sheet group is even, not only determining that the sheets in the monochrome sheet group and at least two sheets each lying before and after and sandwiching the monochrome sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting image data of corresponding four pages to the first printing device when image data of all pages is monochrome image data and to the second printing device when image data of at least one page is color image data, so that the sheets of the saddle-stitched group or the adhesive bound group determined in the determination are formed by respective papers.

9. The non-transitory recording medium according to claim 8, wherein the imposition process program causes the computer to perform third judgment of judging whether a count of respective sheets from the sheet at the one end of the sheet collection to the last sheet of the monochrome sheet group is odd or even, if it is judged in the first sheet count judgment of the information processor that the count of the monochrome sheets in the monochrome sheet group is odd, and in the determination, causes the computer to perform a process for determining that respective sheets to the last sheet of the monochrome sheet group are sheets of an adhesive bound group when it is judged in the third judgment that the count of the respective sheets to the last sheet of the monochrome sheet group is even and that the sheets to the sheet immediately before the last sheet of the monochrome sheet group are sheets of an adhesive bound group when it is judged that the count is odd.

10. The non-transitory recording medium according to claim 8, wherein the imposition process program causes the computer to perform a process for further judging in the first sheet count judgment whether the count of the monochrome sheets in the monochrome sheet group is equal to or smaller than a predetermined value, and for judging in the determination that these monochrome sheets are sheets of a saddle-stitched group, when the count of the monochrome sheets is equal to or smaller than the predetermined value.

11. An information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, the information processor comprising:

a first sheet count judging section for judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

a second sheet count judging section for judging whether a count of sheets from the one end of the sheet collection to a sheet immediately before the color sheet group is odd or even, when the first sheet count judging section judges that the count of the color sheets in the color sheet group is even;

a determination section for not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the color sheet group is odd, and if the second sheet count judging section judges that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers.

12. The information processor according to claim 11, comprising:

a third judging section for judging whether a count of respective sheets from a sheet at the one end of the sheet collection to the last sheet of the color sheet group is odd or even, if the first sheet count judging section judges that the count of the color sheets in the color sheet group is odd, wherein the determination section determines that respective sheets to the last sheet of the color sheet group are sheets of an adhesive bound group when the third judging section judges that the count of the respective sheets to the last sheet of the color sheet group is even, and that respective sheets to the sheet immediately before the last sheet of the color sheet group are sheets for an adhesive bound group when the third judging section judges that the count is odd.

13. The information processor according to claim 11, wherein the first sheet count judging section further judges whether or not the count of the color sheets in the color sheet group is equal to or smaller than a predetermined value, and the determination section judges that these color sheets are sheets of a saddle-stitched group when the count of the color sheets is equal to or smaller than the predetermined value.

14. A printing system, comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor comprises:

a first sheet count judging section for judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

a second sheet count judging section for judging whether a count of sheets from the one end of the sheet collection to a sheet immediately before the color sheet group is odd or even, when the first sheet count judging section judges that the count of the color sheets in the color sheet group is even;

a determination section for not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if the second sheet count judging section judges that the count of the sheets from the one end of the sheet collection to the sheet immediately before the color sheet group is odd, and if the second sheet count judging section judges that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and a transmission section for transmitting to one or more printing devices image data of corresponding four pages as monochrome image data if image data of all pages is monochrome image data and as color image data if image data of at least one page is color image data, so that the sheets of the saddle-stitched group or the adhesive bound group determined by the determination section are formed by respective papers, wherein the first and second printing devices print on papers the image data transmitted from the information processor.

15. The printing system according to claim 14, comprising:

a third judging section for judging whether a count of respective sheets from a sheet at the one end of the sheet collection to the last sheet of the color sheet group is odd or even, if the first sheet count judging section of the information processor judges that the count of the color sheets in the color sheet group is odd, wherein the determination section determines that respective sheets to the last sheet of the color sheet group are sheets of an adhesive bound group when the third judging section judges that the count of the respective sheets to the last sheet of the color sheet group is even, and that the respective sheets to the sheet immediately before the last sheet of the color sheet group are sheets for an adhesive bound group when the third judging section judges that the count is odd.

16. The printing system according to claim 14, wherein the first sheet count judging section of the information processor further judges whether or not the count of the color sheets in the color sheet group is equal to or smaller than a predetermined value, and the determination section judges that these color sheets are sheets of a saddle-stitched group when the count of the color sheets is equal to or smaller than the predetermined value.

17. A method for printing to be performed in a printing system comprising an information processor for performing an imposition process to impose pages to papers when a sheet collection comprised of a plurality of sheets on which pages are arranged in order is prepared, by combining a plurality of papers on which printing is performed in the unit of four pages and which are center-folded by being doubled over, and on which two sheets having each one page arranged on a front and a back are formed on both sides of a back section, a first printing device for performing monochrome-printing, and a second printing device for performing color-printing, wherein the information processor performs:

first sheet count judgment of judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

second sheet count judgment of judging whether a count of sheets from the one end of the sheet collection to a sheet immediately before the color sheet group is odd or even, when it is judged in the first sheet count judgment that the count of the color sheets in the color sheet group is even;

determination of not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the color sheet group is odd, and if it is judged in the second sheet count judgment that the count of sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting to one or more printing devices image data of corresponding four pages as monochrome image data if image data of all pages is monochrome image data and as color image data if image data of at least one page is color image data, so that the sheets of the saddle-stitched group or the adhesive bound group determined in the determination are formed by respective papers, and wherein the first and second printing devices perform printing on papers the image data transmitted from the information processor.

18. A non-transitory recording medium in which an imposition process program for causing a computer of an information processor to be used when a sheet collection comprised of a plurality of sheets on which pages are arranged in order is prepared, by combining a plurality of papers on which printing is performed in the unit of four pages and which are center-folded by being doubled over with a back section as a center, and on which two sheets having each one page arranged on a front and a back are formed on both sides of the back section, to perform:

first sheet count judgment of judging whether a count of color sheets in a color sheet group is even or odd when in the sheet collection planned to be prepared, there exists the color sheet group comprised of one or more consecutive color sheets on at least one of whose front and back sides a color page is arranged, between the first monochrome sheet group when viewed from one end of the sheet collection and a next monochrome sheet group of monochrome sheet groups comprised of one or more consecutive monochrome sheets all of whose front and back sides are monochrome pages;

second sheet count judgment of judging whether a count of sheets from the one end of the sheet collection to a sheet immediately before the color sheet group is odd or even, when it is judged in the first sheet count judgment that the count of the color sheets in the color sheet group is even;

determination of not only determining that the sheets in the color sheet group and each one sheet lying before and after and sandwiching the color sheet group are sheets of a saddle-stitched group formed of papers for saddle-stitching, but also determining that sheets lying more on the side of the one end of the sheet collection than the determined sheets are sheets of an adhesive bound group formed of papers for adhesive binding if it is judged in the second sheet count judgment that the count of the sheets from the one end of the sheet collection to the sheet immediately before the color sheet group is odd, and if it is judged in the second sheet count judgment that the count of the sheets from the one end of the sheet collection to the sheet immediately before the color sheet group is even, not only determining that the sheets in the color sheet group and at least two sheets each lying before and after and sandwiching the color sheet group are sheets of a saddle-stitched group, but also determining that the sheets lying more on the side of the one end of the sheet collection than the determined sheets are sheets of an adhesive bound group, and determining whether each sheet of the sheet collection is a sheet of the saddle-stitched group or a sheet of the adhesive-bound group, by sequentially performing this process towards other end of the sheet collection and to sheets whose group has not been determined; and transmission of transmitting to one or more printing devices image data of corresponding four pages as monochrome image data if image data of all pages is monochrome image data and as color image data if image data of at least one page is color image data, so that the sheets of the saddle-stitched group or the adhesive bound group determined in the determination are formed by respective papers.

19. The non-transitory recording medium according to claim 18, wherein the imposition process program causes the computer to perform third judgment of judging whether a count of respective sheets from the sheet at the one end of the sheet collection to the last sheet of the color sheet group is odd or even, when it is judged in the first sheet count judgment of the information processor that the count of the color sheets in the color sheet group is odd, and in the determination, causes the computer to perform a process for determining that respective sheets to the last sheet of the color sheet group are sheets of an adhesive bound group when it is judged in the third judgment that the count of the respective sheets to the last sheet of the color sheet group is even and that the sheets to the sheet immediately before the last sheet of the color sheet group are sheets of an adhesive bound group when it is judged that the count is odd.

20. The non-transitory recording medium according to claim 18, wherein the imposition process program causes the computer to perform a process for further judging in the first sheet count judgment whether the count of the color sheets in the color sheet group is equal to or smaller than a predetermined value, and for judging in the determination that these color sheets are sheets of a saddle-stitched group, when the count of the color sheets is equal to or smaller than the predetermined value.

* * * * *